United States Patent
Lee et al.

(10) Patent No.: US 12,056,517 B2
(45) Date of Patent: Aug. 6, 2024

(54) ELECTRONIC APPARATUS AND METHOD FOR CONTROLLING ELECTRONIC APPARATUS

(71) Applicant: SAMSUNG ELECTRONICS CO., LTD., Suwon-si (KR)

(72) Inventors: Yeonho Lee, Suwon-si (KR);
Sangwook Park, Suwon-si (KR);
Youngbin Shin, Suwon-si (KR);
Kookjin Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/674,540

(22) Filed: Feb. 17, 2022

(65) Prior Publication Data
US 2022/0197694 A1    Jun. 23, 2022

Related U.S. Application Data

(63) Continuation of application No. PCT/KR2021/012857, filed on Sep. 17, 2021.

(30) Foreign Application Priority Data

Dec. 21, 2020    (KR) .................. 10-2020-0180263

(51) Int. Cl.
*G06F 3/048*    (2013.01)
*G06F 9/48*    (2006.01)
*G10L 15/26*    (2006.01)

(52) U.S. Cl.
CPC ............ *G06F 9/4843* (2013.01); *G10L 15/26* (2013.01)

(58) Field of Classification Search
CPC ............................ G06F 9/4843; G10L 15/26
See application file for complete search history.

(56) References Cited

U.S. PATENT DOCUMENTS

| 7,823,080 B2 | 10/2010 | Miyajima et al. |
| 10,311,877 B2 | 6/2019 | Lee et al. |
| (Continued) |

FOREIGN PATENT DOCUMENTS

| JP | 2003-091347 | 3/2003 |
| JP | 3725566 | 12/2005 |
| (Continued) |

OTHER PUBLICATIONS

International Search Report for PCT/KR2021/012857 dated Dec. 20, 2021, 6 pages (with English Translation).

(Continued)

*Primary Examiner* — David Phantana-angkool
(74) *Attorney, Agent, or Firm* — Nixon & Vanderhye P.C.

(57) ABSTRACT

Disclosed are an electronic device and a method for controlling thereof. According to an embodiment, a method for controlling an electronic apparatus includes: obtaining a voice command while a first application is executed in foreground; obtaining a text by recognizing the voice command; identifying at least one second application to perform the voice command based on the text; based on information of the first application and the at least one second application; identify whether to execute each of the first application and the at least one second application in the foreground or background of the electronic apparatus; and providing the first application and the at least one second application based on the identification.

7 Claims, 17 Drawing Sheets

(56) References Cited

U.S. PATENT DOCUMENTS

| | | | |
|---|---|---|---|
| 10,497,365 B2 | 12/2019 | Gruber et al. | |
| 10,649,627 B2 | 5/2020 | Ko et al. | |
| 11,016,968 B1* | 5/2021 | Hoover | G10L 15/22 |
| 11,705,113 B2* | 7/2023 | Jacob | G06F 16/90332 |
| | | | 704/200 |
| 2010/0281481 A1* | 11/2010 | Rainisto | G06F 3/0481 |
| | | | 718/100 |
| 2012/0209608 A1 | 8/2012 | Lee | |
| 2013/0227419 A1* | 8/2013 | Lee | G06F 9/48 |
| | | | 715/728 |
| 2016/0062635 A1* | 3/2016 | Feit | G06F 9/485 |
| | | | 715/765 |
| 2020/0301571 A1* | 9/2020 | Sandu | G06F 3/04845 |
| 2020/0365145 A1* | 11/2020 | Ryu | G10L 15/063 |
| 2022/0197694 A1* | 6/2022 | Lee | G10L 15/26 |
| 2022/0415309 A1* | 12/2022 | Jacob | G06F 40/30 |
| 2022/0415312 A1* | 12/2022 | Jacob | G10L 15/22 |
| 2022/0415326 A1* | 12/2022 | Jacob | G10L 15/22 |
| 2023/0401456 A1* | 12/2023 | Schoeniger | G06N 5/022 |

FOREIGN PATENT DOCUMENTS

| | | |
|---|---|---|
| JP | 2018-101286 | 6/2018 |
| KR | 10-2012-0093597 | 8/2012 |
| KR | 10-2013-0097433 | 9/2013 |
| KR | 10-2014-0105340 | 9/2014 |
| KR | 10-1777392 | 9/2017 |
| KR | 10-2018-0042564 | 4/2018 |
| KR | 10-2018-0080629 | 7/2018 |

OTHER PUBLICATIONS

Written Opinion of the ISA for PCT/KR2021/012857 dated Dec. 20, 2021, 8 pages (with English Translation).

* cited by examiner

OOO, PLEASE TURN ON SUNNY.

YES, I FOUND CONTENTS OF SUNNY FROM A APPLICATION AND B APPLICATION. WHICH WOULD YOU WATCH?

UPPER ONE

YES, I WILL PLAY CONTENTS OF SUNNY FROM A APPLICATION.

ELECTRONIC APPARATUS AND METHOD FOR CONTROLLING ELECTRONIC APPARATUS

CROSS-REFERENCE TO RELATED APPLICATIONS

This application is a continuation of International Application No. PCT/KR2021/012857, filed on Sep. 17, 2021, which is based on and claims priority to Korean Patent Application No. 10-2020-0180263, filed on Dec. 21, 2020, in the Korean Intellectual Property Office, the disclosures of which are incorporated by reference herein in their entireties.

BACKGROUND

Field

The disclosure relates to an electronic apparatus and a controlling method thereof and, for example, to an electronic apparatus for identifying at least one application to perform a voice command of a user and a controlling method thereof.

Description of the Related Art

The amount of information present online and offline is recently increasing exponentially, and a user may obtain desired information anytime and anywhere through an electronic apparatus by the advancement of electronic communication technology.

Recently, a speech recognition system for generating a control command corresponding to a voice command of a user has been widely used, so that an electronic apparatus may properly perform the operation desired by the user.

Also, an artificial intelligence (AI) system implementing human level intelligence is used in various fields, and a command response system is utilized in various systems in an AI system.

A related-art speech recognition system could identify only one application to perform a voice command of a user through a voice command of a user. Accordingly, a related-art speech recognition system has a problem of providing only one application even in the case of a user's voice command which needs to use a plurality of applications.

In addition, when an application for executing a voice command of a user is identified in the related art, an identified application is executed in the foreground, instead of an application which is being executed in the foreground of the existing electronic apparatus. Accordingly, there is a need for providing an application to perform a voice command of a user in the foreground of an electronic apparatus along with an electronic apparatus which has been executed in the foreground.

SUMMARY

Embodiments of the disclosure provide an electronic apparatus which identifies at least one application to perform a voice command of a user, and provides the identified at least one application and an application which is executed in the foreground of the existing electronic apparatus, and a method for controlling thereof.

According to an example embodiment, a method for controlling an electronic apparatus includes: obtaining a voice command while a first application is executed in foreground, obtaining a text by recognizing the voice command, identifying at least one second application to perform the voice command based on the text, based on information about the first application and the at least one second application, identifying whether to execute each of the first application and the at least one second application in the foreground or background of the electronic apparatus, and providing the first application and the at least one second application based on the identification.

The providing may include, based on an application to be executed in the foreground of the electronic apparatus being plural as a result of the identification, identifying layouts of each of the plurality of applications and executing each of the plurality of applications in the foreground of the electronic apparatus according to the identified layouts.

The identifying the layouts may include identifying layouts of each of the plurality of applications through an artificial intelligence model trained based on layout usage history of the plurality of applications.

The identifying may include identifying a third application to be executed in the foreground of the electronic device among the at least one second applications based on the text; and identifying whether to execute the first application along with the third application in the foreground based on information about the third application.

The identifying whether to execute the first application along with the third application may include identifying whether to execute the first application along with the third application through the artificial intelligence model trained based on usage history that the first application is executed along with the third application in the foreground.

The identifying whether to execute the first application along with the third application may include, based on identification that the first application is to be executed along with the third application in the foreground, identifying layouts of each of the first application and the third application; and executing each of the first application and the third application in the foreground of the electronic apparatus according to the identified layouts.

The identifying whether to execute along with the third application may include, based on identification that the first application is not executed in the foreground along with the third application, executing the third application in the foreground of the electronic apparatus.

The method may further include, based on the third application being plural, identifying layouts of each of the plurality of third applications and executing each of the plurality of third applications in the foreground of the electronic apparatus according to the identified layouts.

The executing the third application in the foreground of the electronic apparatus further may include executing the first application in the background of the electronic apparatus.

The identifying may include identifying a fourth application to be executed in the background of the electronic apparatus among the at least one second applications based on the text, and the providing may include controlling so that an operation corresponding to the voice command is executed in the fourth application while operating the fourth application in the background.

According to an example embodiment, an electronic apparatus includes: a memory storing at least one instruction; and a processor configured to control the electronic apparatus by executing at least one instruction stored in the memory, wherein the processor is configured to: control the electronic apparatus to obtain a voice command while a first application is executed in foreground, obtain a text by recognizing the voice command, identify at least one second application to perform the voice command based on the text, based on information about the first application and the at least one second application, determine whether to execute each of the first application and the at least one second application in the foreground or background of the electronic apparatus, and provide the first application and the at least one second application based on the determination result.

The processor may be configured to, based on an application to be executed in the foreground of the electronic apparatus being plural as a result of the determination, identify layouts of each of the plurality of applications, and execute each of the plurality of applications in the foreground of the electronic apparatus according to the identified layouts.

The processor may be configured to identify the layouts comprises identifying layouts of each of the plurality of applications through an artificial intelligence model trained based on layout usage history of the plurality of applications.

The processor may be configured to identify a third application to be executed in the foreground of the electronic device among the at least one second applications based on the text, and identify whether to execute the first application along with the third application in the foreground based on information about the third application.

The processor may be configured to identify whether to execute the first application along with the third application through the artificial intelligence model trained based on usage history that the first application is executed along with the third application in the foreground.

The processor may be configured to, based on identification that the first application is to be executed along with the third application in the foreground, identify layouts of each of the first application and the third application and execute each of the first application and the third application in the foreground of the electronic apparatus according to the identified layouts.

The processor may be configured to, based on identification that the first application is not executed in the foreground along with the third application, execute the third application in the foreground of the electronic apparatus.

The processor may be configured to, based on the third application being plural, identify layouts of each of the plurality of third applications and execute each of the plurality of third applications in the foreground of the electronic apparatus according to the identified layouts.

The processor may be configured to execute the first application in the background of the electronic apparatus.

The processor may be configured to identify a fourth application to be executed in the background of the electronic apparatus among the at least one second applications based on the text, and may control the electronic apparatus to perform an operation corresponding to the voice command is executed in the fourth application while operating the fourth application in the background.

According to various example embodiments, the electronic apparatus according to the disclosure may identify a plurality of applications corresponding to a voice command of a user, and provide the plurality of applications together with an application which is being executed in the foreground.

BRIEF DESCRIPTION OF THE DRAWINGS

The above and other aspects, features, and advantages of certain embodiments of the present disclosure will be more apparent from the following detailed description taken, in conjunction with the accompanying drawings, in which.

DETAILED DESCRIPTION

Hereinafter, the disclosure will be described in greater detail with reference to the drawings.

Figure 1:
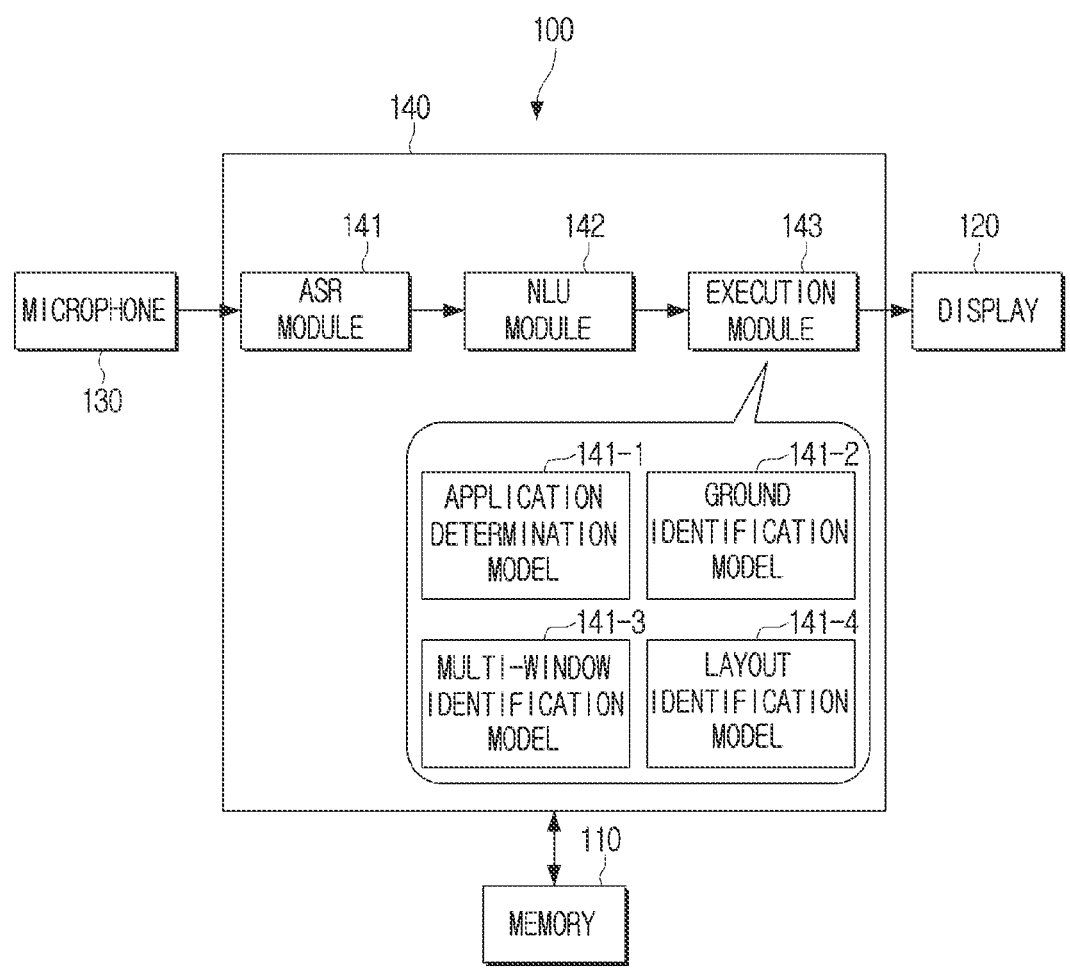
FIG. 1 is a block diagram illustrating an example configuration of an electronic apparatus for providing an application according to a voice command of a user, according to various embodiments.

FIG. 1 is a block diagram illustrating an example configuration of the electronic apparatus 100 for providing an application according to a voice command of a user according to various embodiments.

As shown in FIG. 1, an electronic apparatus 100 may include a memory 110, a display 120, a microphone 130, and a processor (e.g., including processing circuitry) 140. According to the disclosure, the electronic apparatus 100 may be implemented as various types of electronic apparatuses such as, for example, and without limitation, a smart phone, an augmented reality (AR) glass, a tablet personal computer (PC), a mobile phone, a video phone, an electronic book reader, a TV, a desktop PC, a laptop PC, a netbook computer, a workstation, a camera, a smart watch, or the like. However, the embodiment is not limited thereto and some configurations may be added or omitted depending on the type of electronic apparatus.

The memory 110 may store instructions or data related to at least one another element of the electronic apparatus 100. The memory 110 may be implemented as a non-volatile memory, a volatile memory, a flash memory, a hard disk drive (HDD), a solid-state drive (SSD), or the like. The memory 110 is accessed by the processor 140 and reading/writing/modifying/deleting/updating of data by the processor 140 may be performed.

In the disclosure, the long term memory may include the memory 110, read-only memory (ROM) in the processor 140, RAM, or a memory card (for example, a micro secure digital (SD) card, and a memory stick) mounted to the electronic apparatus 100. In addition, the memory 110 may store programs and data for controlling various screens to be displayed in the display area of the display of the electronic apparatus 100.

As described above, the memory 110 may store at least one instruction. Here, the instructions may be for controlling the electronic apparatus 100. For example, the memory 110 may store instructions related to a speech recognition system for performing an operation on a user's voice command. The memory 110 may include a plurality of configurations (or modules) that make up a speech recognition system in accordance with the disclosure, which will be described later.

The memory 110 may store an AI agent to perform speech recognition system. The electronic apparatus 100 may use an AI agent to generate a natural language as a response to user utterance. At this time, the AI agent is a dedicated program to provide AI-based services (for example, speech recognition services, secretarial services, translation services, search services, etc.) and may be executed by existing general-purpose processors (for example, CPUs) or separate AI-only processors (for example, GPUs).

The display 120 may display various information under the control of the processor 140. The display 120 may display a screen provided by at least one application executed in the foreground in the electronic apparatus 100.

The display 120 may display a response to the user voice command. The display 120 may display a search result or a response based on a user's voice command.

The display 120 may be implemented as a display of various types such as, for example, and without limitation, a liquid crystal display (LCD), light emitting diode (LED), organic light emitting diodes (OLED), liquid crystal on silicon (LCoS), digital light processing (DLP), or the like. In the display 120, a backlight unit, a driving circuit which may be implemented as an a-si TFT, low temperature poly silicon (LTPS) TFT, organic TFT (OTFT), or the like, may be included as well. The display 120 may be implemented with various display such as a foldable display, a rollable display, or the like. The display 120 may be coupled with a touch sensor and implemented as a touch screen.

The microphone 130 may include a component for receiving user voice from the electronic apparatus 100. The microphone 130 may receive an external user voice using a microphone and process the received user voice data as electrical voice data. In this case, the microphone 130 may transmit the processed voice data to the processor 140.

The processor 140 may be electrically connected to the memory 110 and may include various processing circuitry to control overall operations and functions of the electronic apparatus 100. The processor 140 may be configured with one or a plurality of processors. One or a plurality of processors may include a general purpose processor, such as, for example, and without limitation, a central processing unit (CPU), a dedicated processor, an application processor (AP), or the like, a graphics-only processor such as graphics processing unit (GPU), visual processing unit (VPU), or the like, or an AI-dedicated processor such as neural network processing unit (NPU).

The one or more processors control the processing of the input data according to a predefined operating rule or AI model stored in the memory 110. The predefined operating rule or AI model may be made through learning. That the AI model is made through learning may refer, for example, to the learning algorithm being applied to a plurality of learning data, so that a predefined operating rule or AI model of a desired characteristic is generated. The learning of the AI model may be performed in a device itself in which AI according to the disclosure is performed, and may be implemented through a separate server/system.

The AI model according to the disclosure may include a plurality of neural network layers. Each layer may have a plurality of weight values, and performs a layer operation through calculation of a previous layer and an operation of a plurality of weights. Examples of neural networks may include, but are not limited to, a convolutional neural network (CNN), a deep neural network (DNN), a recurrent neural network (RNN), a Restricted Boltzmann Machine Task (RBM), a deep belief network (DBN), a bidirectional deep neural network (BRDNN), deep Q-networks, or the like, and the neural network in the disclosure is not limited to the above-described example except when specified.

The processor 140 may drive an operating system or application program to control hardware or software components connected to the processor 140, and perform various data processing and algorithms. The processor 140 may also load instructions or data received from at least one of the other components into a volatile memory and store the various data in a non-volatile memory.

The processor 140 may be electrically connected to the memory 110 to control the overall operation and function of the electronic apparatus 100. The processor 140 may provide a speech recognition system that performs an operation corresponding to a user's voice command by executing at least one instruction stored in the memory 110. The speech recognition system may include an automatic speech recognition (ASR) module (e.g., including various processing circuitry and/or executable program elements) 141, a natural language understanding (NLU) module (e.g., including various processing circuitry and/or executable program elements) 142, and an execution module (e.g., including various processing circuitry and/or executable program elements) 143. Each module may be stored in the memory 110. However, the embodiment is not limited thereto and the speech recognition system may additionally include a necessary module according to cases.

When the speech recognition system is executed, a plurality of modules 141, 142, and 143 may be loaded into a memory (e.g., a volatile memory) included in the processor 140. That is, when the speech recognition system is executed, the processor 140 may load the plurality of modules 141, 142, and 143 from the non-volatile memory to the volatile memory to execute the functions of the plurality of modules 141, 142, and 143. Loading may refer, for example, to an operation of retrieving data stored in the non-volatile memory into the volatile memory so that the processor 140 may access.

According to an embodiment, a translation function may be implemented through a plurality of modules 141, 142, and 143 stored in the memory 110, as shown in FIG. 1, but the speech recognition system may be implemented in an external server.

The plurality of modules 141, 142, and 143 according to the disclosure may be implemented in respective software, but some modules may be implemented in a combination of hardware and software. In an embodiment, the plurality of modules 141, 142, and 143 may be implemented with one software. Some modules may be implemented within the electronic apparatus 100, and some other modules may be implemented in an external server.

The ASR module 141 may include various processing circuitry and/or executable program elements and convert a user's input (especially, user voice command) received at the electronic apparatus to the text data. The ASR module 141 may convert the user voice command data obtained through the microphone 130 to text data. For example, the ASR module 141 may include an utterance recognition module. The speech recognition module may include an acoustic model and a language model. For example, the acoustic model may include information related to vocalization, and the language model may include information on unit phoneme information and a combination of unit phoneme information. The speech recognition module may convert the user utterance into text data using the information related to speech and information on the unit phoneme information. Information about the acoustic model and language model may be stored in, for example, an automatic speech recognition database (ASR DB).

The natural language understanding module (NLU) 142 may include various processing circuitry and/or executable program elements and recognize the intent of a user and a domain of user's utterance by performing syntactic analysis or semantic analysis. Grammatical analysis may divide the user input in grammatical units (for example: words, phrases, morphemes, or the like), and grasp which grammatical elements the divided units have. The semantic analysis may be performed using semantic matching, rule matching, formula matching, or the like. The NLU module 142 may obtain a domain, intent, or a slot (or parameter) required to express the intent by the user input.

The NLU module 142 may determine the intent of the user and the slot by using a matching rule that is divided into the domain, intent and the slot required to identify the intent. For example, one domain (e.g., web application) may include a plurality of intents (e.g., webpage open, webpage search, etc.), and one intent may include multiple slots (e.g., webpage address, search word, etc.). The plurality of rules may include, for example, one or more essential element slots. For example, the matching rules may be stored in a natural language understanding database (NLU) database.

The NLU module 142 may identify the meaning of the word extracted from the user voice command using linguistic features (e.g., grammatically element) such as morpheme, phrase, etc., and may match the meaning of the identified word with the domain and intent to determine the intent of the user. For example, the NLU module 142 may calculate how many words extracted from the user query are included in each domain and intent to determine the user intent. According to an embodiment, the NLU module 142 may determine a slot corresponding to the user voice input using a word which becomes a basis for identifying the intent.

The execution module 143 may include various processing circuitry and/or executable program elements for providing at least one application based on the intent, the slot obtained through the NLU module 142, and the text data corresponding to the user voice command obtained through the ASR module 141.

The execution module 143 may include an application determination model 141-1, a ground identification model 141-2, a multi-window identification model 141-3, and a layout identification model 141-4.

The application determination model 141-1 may include a model including various processing circuitry and/or executable program elements to identify at least one application for executing a voice command of a user.

According to an embodiment, the application determination model 141-1 may receive at least one of an intent or slot obtained through the NLU module 142, and may identify at least one application to execute a voice command of the user. In this case, the application determination model 141-1 may perform learning by setting, as input data, a plurality of intent and slots, which may be generated through the NLU module 142, and at least one application corresponding to the inputted plurality of intents and slots, respectively, as output data.

According to an embodiment, the application determination model 141-1 may receive text data corresponding to the user voice command obtained through the ASR module 141 to identify at least one application to execute the voice command of the user. In this case, the application determination model 141-1 may perform learning with input a plurality of text data, which may be generated through the ASR module 141, as input data and with at least one application corresponding to each of the inputted plurality of text data as output data.

According to an embodiment, the application determination model 141-1 may receive text data corresponding to the user voice command obtained through the ASR module 141 along with the intent and the slot obtained through the NLU module 142, and identify at least one application to execute the voice command of the user. In this case, the application determination model 141-1 may perform learning by setting at least one of a plurality of intents and slots, which may be generated through the NLU module 142, and a plurality of text data, which may be generated through the ASR module 141, as input data, and by setting at least one of a plurality of input intents and slots, and at least one application corresponding to the text as output.

The application determination model 141-1 according to the disclosure may identify a plurality of applications to perform a voice command through a voice command of a user. For example, with respect to a user voice command "please find a route to Gangneung via navigation along with an exciting song," the application determination model 141-1 may identify an application to execute the corresponding user voice command as a music playback application and a navigation application.

The NLU module 142 may obtain the intent of "music playback application execution", "navigation application execution" from the user voice command, "please find a route to Gangneung via navigation along with an exciting song". The application determination model 141-1 may identify an application to execute the voice command of the user as a "navigation application" through the intent of the "music playback application execution" and may identify an application executing the voice command of the user as a "music playback application" through the intent of the "navigation application execution".

According to an embodiment, the application determination model 141-1 may identify an application executing the voice command of the user as a "navigation application" and a "music playback application" via the text data, "please find a route to Gangneung via navigation along with an exciting song". The application determination model 141-1 may identify an application for executing the voice command of the user as a "music playback application" through the text "exciting" and "song" from the text data, and may identify an application for executing the voice command of the user as a "navigation application" through the texts "navigation," "Gangneung," and "please find."

The ground identification model 141-2 may include a model including various processing circuitry and/or executable program elements for identifying whether to execute at least one application identified in the app decision model 141-1 in the foreground of the electronic apparatus or in the background. If one application is identified to run in the foreground of the electronic apparatus through the ground identification model 141-2, the processor 140 may control the display 120 to display the corresponding application screen on the display 120 of the electronic apparatus 100. When the application is identified to be executed in the background of the electronic apparatus through the ground identification model 141-2, the processor 140 may control the application to be operated without displaying the application screen on the display 120 of the electronic apparatus 100.

Execution of the application according to the disclosure in the foreground may refer, for example, to the screen provided in the application being displayed on the display. Execution of the application in the background may refer, for example, to the application being executed without displaying the application screen on the display.

According to an embodiment, the ground identification model 141-2 may receive information about at least one application identified through the application determination model 141-1 and at least one of the intent and the slot obtained through the NLU module 142, and may identify whether each of the at least one application identified through the application determination model 141-1 is executed in the foreground or in the background. The information on the application may include various information to identify an application such as information on an application type (e.g., music reproduction application, navigation application), information on the name of an application, or the like. In this example, the ground identification model 141-2 may input, as input data, at least one of a plurality of intents and slots, which may be generated through the NLU module 142, and information on an application corresponding to the plurality of intents and slots, respectively, and set, as output data, information about whether an application corresponding to the input data is executed in the foreground or background to perform learning.

According to an embodiment, the ground identification model 141-2 may receive information on at least one application identified through the application determination model 141-1 and the text data obtained through the ASR module 141, and may identify whether each of the at least one application identified through the application determination model 141-1 is to be executed in a foreground or a background. In this example, the ground identification model 141-2 may set the text data that may be generated through the ASR module 141 and the application information (e.g., application type, name) corresponding to each of the text data as input data, and may set information on whether an application corresponding to the input data is to be executed in a foreground or a background as output data to perform learning. For example, the ground identification model 141-2 may be trained through learning data labeled with the type of application and the type of ground, as shown in Table 1.

TABLE 1

| Application Types | Text | Ground |
|---|---|---|
| music playback application | Please turn on an exciting song | background |
| music playback application | Who is a composer of Binggo? | background |
| music playback application | Please show me lyrics of Singlala | foreground |
| navigation application | Please find a route to Suwon | foreground |
| navigation application | Is traffic is jammed on the Gyeongbu Expressway now? | background |
| navigation application | How long will it take to Busan? | background |
| navigation application | Please find a route to Gangneung | foreground |
| recipe application | How many calories are in one sweet potato? | background |
| recipe application | Please find a recipe for kimchi stew | foreground |
| Restaurant application | Please find a must-go restaurant in Ilsan | foreground |

According to an embodiment, the ground identification model 141-2 may receive information about at least one application identified through the application determination model 141-1 and at least one of an intent and a slot obtained through the ASR module 141, and may identify whether each of the at least one application identified through the application determination model 141-1 is executed in a foreground or a background. In this case, the ground identification model 141-2 may set the text data that may be generated through the ASR module 141 and at least one of an intent and a slot corresponding to the text data and the application information as input data, and may set information on whether an application corresponding to the input data is executed in a foreground or a background as output data to perform learning.

The ground identification model 141-2 according to an example embodiment may identify whether to execute each of a plurality of applications to perform a voice command of a user in a foreground or background. For example, with respect to the user voice command "please find a route to Gangneung via navigation with an exciting song", the ground identification model 141-2 may identify that the ground identification model 141-2 is executed in the background, and the navigation application is executed in the foreground.

The multi-window identification model 141-3 may include a model including various processing circuitry and/or executable program elements to identify whether the application running in the foreground of the electronic apparatus 100 is to be provided with an application to perform the user voice command, when a user voice command is received.

The multi-window identification model 141-3 may receive information about at least one application identified in the application determination model 141-1 and information on an application executed in the foreground of the electronic apparatus when a user voice command is received, and may identify whether an application executed in the foreground is to be executed as a multi-window with an application to be executed in the foreground identified in the ground identification model 141-2.

For example, while the A application is being executed in the foreground, a user voice command for execution of the B application is received, and the users frequently use the A application and the B application as a multi-window in the foreground, the multi-window identification model 141-3 may identify that the A application is to be executed as a multi-window with the B application.

The multi-window identification model 141-3 according to the disclosure may be trained based on first information about a multi-window usage history of users. Here, the first information may be information on a combination of a plurality of applications using multi-window. The first information is information about the usage history that a plurality of applications are executed together in the foreground.

The multi-window identification model 141-3 may be trained through various types of learning data. The multi-window identification model 141-3 applied to the A manufacturer may be trained through the information on the multi-window usage history of users for the electronic apparatuses of the A manufacturer, but the embodiment is not limited thereto. For example, the multi-window identification model 141-3 applied to the "A tablet" may be trained through only information about the multi-window usage history of users for the "A tablet". In addition, for example, the multi-window identification model 141-3 applied to an electronic apparatus of a corresponding user may be trained through only a multi-window usage history of each user.

The layout identification model 141-4 may include a model including various processing circuitry and/or executable program elements for identifying the layout of each of the plurality of applications to be executed in the foreground identified in the multi-window identification model 141-3. The layout may refer, for example, to an area occupied by one application in the foreground screen of the electronic apparatus. Through the layout identification model 141-4 according to the disclosure, a location and a size of an area in which each of the plurality of applications to be executed in the foreground may be displayed in the foreground screen may be identified.

If an application to be executed in the foreground is identified as a plurality of applications in the multi-window identification model 141-3, the layout identification model 141-4 may receive information about a plurality of applications to be executed in the foreground and identify the location and size of the area to be displayed in the foreground screen.

For example, while the A application is being executed in the foreground, if it is identified that a user voice command for execution of the B application is received, and when the A application and the B application are identified to be executed together in the foreground through the multi-window identification model 133, the layout identification model 141-4 may identify the location and size of the area where each of the A application and the B application are to be displayed in the foreground screen, respectively. Specifically, in the case where the existing users have a history of using the A application in the right area of the foreground screen, and the B application in the left area in the same size of the foreground screen for several times, the layout identification model 141-4 may identify to display the A application in the right area of the foreground screen and the B application in the left area of the foreground screen in the same size.

The layout identification model 141-4 according to the disclosure may perform learning based on second information about a multi-window usage history of users. The second information may be information about using a plurality of applications with which layout, that is, information on the layout usage history of each of the plurality of applications.

The layout identification model 141-4 may perform learning through various types of learning data. The layout identification model 141-4 applied to the A manufacturer may be trained through the information on the layout usage history for the plurality of applications of the electronic apparatuses of the A manufacturer, but the embodiment is not limited thereto. That is, as an example. For example, the layout identification model 141-4 applied to the "A tablet" may be trained through only information about the layout usage history for a plurality of applications of users for the "A tablet". According to one example, the layout identification model 141-4 applied to the electronic apparatus of the corresponding user may be trained even through only the layout usage history for each of the plurality of applications of the users using the electronic device.

If a layout of a plurality of applications to be executed in the foreground is identified through the layout identification model 141-4, the execution module 143 may provide a plurality of applications according to the identified result.

For example, the execution module 143 may identify a path for executing the at least one application through the results obtained through the NLU module 142, the application determination model 141-1, the ground identification model 141-2, the multi-window identification model 141-3, and the layout identification model 141-4.

For a user voice command "please find a route to Gangneung via navigation along with A song", the execution module 143 may determine each of the operations to be performed in a music playback application and a navigation application. The execution module 143 may determine whether the operations to be performed in the music playback application as (check if music playback application is logged in search A song in a music playback application playback A song in the background). The execution module 143 may determine operations to be performed in the navigation application as (check if navigation playback application is logged in search Gangneung in a navigation application provide a route search according to a search result on a full screen in the foreground).

The execution module 143 may control at least one application so that an operation corresponding to the user voice command is performed according to the identified path.

The operation of the execution module 143 described above may be divided into a plurality of modules and performed.

According to an embodiment, the speech recognition system according to the disclosure may identify a plurality of applications corresponding to a voice command of a user, and provide the plurality of applications together with an application running on an existing foreground.

Figure 2A:
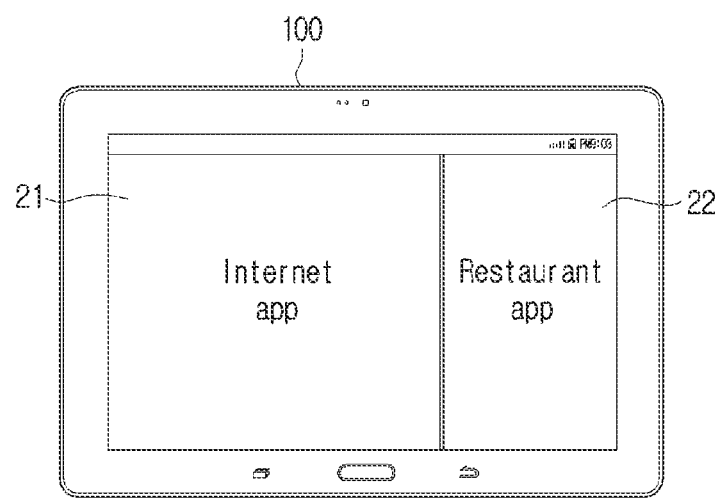
FIG. 2A is a diagram illustrating an example of displaying an application executing a user voice command with at least one of an application which is executed in accordance with a user voice command together as a multi-window according to a user voice command, according to various embodiments.
Figure 2A:
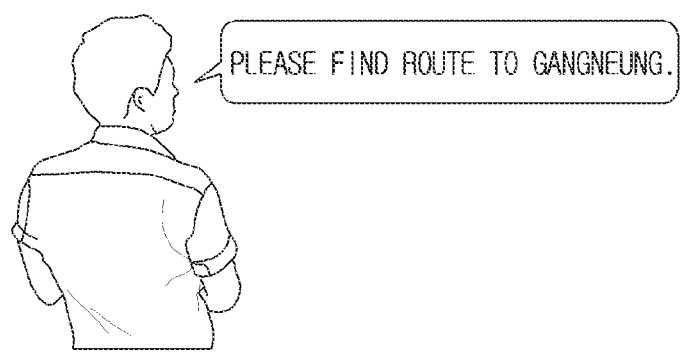
Figure 2B:
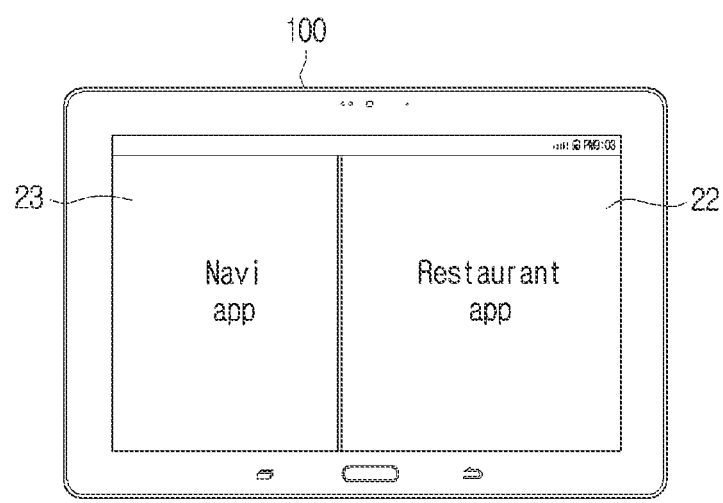
FIG. 2B is a diagram illustrating an example of displaying at least one application among application which is being executed according to a user voice command and an application to perform a user voice command together as a multi-window according to various embodiments.

FIGS. 2A and 2B are diagrams illustrating an example of displaying an application executing a user voice command with at least one of an application which is executed in accordance with a user voice command together as a multi-window according to a user voice command, according to various embodiments.

Referring to FIG. 2A, the electronic apparatus 100 may receive a user's voice command while an Internet application and a restaurant application are being executed together in the foreground of the electronic apparatus 100. While a screen 21 provided by the Internet application and a screen 22 provided by the restaurant application are being displayed as a multi-window on the display of the electronic apparatus 100, the electronic apparatus 100 may obtain a user voice command "please find a route to Gangneung" through the microphone.

When the user's voice command is obtained, the electronic apparatus 100 may identify an application to perform the user voice command as a navigation application through the application determination model 141-1.

The electronic apparatus 100 may identify whether the navigation application should be executed in the foreground of the electronic apparatus 100 through the ground identification model 141-2. For example, the ground identification model 141-2 may identify that the navigation application is to be executed in the foreground in accordance with the user voice command "please find a route to Gangneung".

The electronic apparatus 100 may identify whether to execute the navigation application together with an Internet application or a restaurant application in the foreground through the multi-window identification model 141-3. For example, when there are a lot of usage histories that the navigation application and the restaurant application are executed together with the multi-window, and there are fewer histories that the users use the navigation application and the Internet application as the multi-window, the electronic apparatus 100 may identify that the navigation application and the restaurant application are to be executed in the foreground.

The electronic apparatus 100 may identify a layout for each of the navigation application and the restaurant application through the layout identification model 141-4. As an example, when existing users use a navigation application and a restaurant application together, there are many cases that a navigation application is displayed to be relatively small to the left of the display and a restaurant application is displayed relatively large to the right of the display, the layout identification model 141-4 may identify the layout for each of the navigation application and the restaurant application in accordance with this usage history.

The electronic apparatus 100 may execute a navigation application and a restaurant application in the foreground according to the identified layout. As shown in FIG. 2B, the electronic apparatus 100 may display a screen 23 provided by the navigation application and the screen 22 provided by the restaurant application together on the display.

Figure 3A:
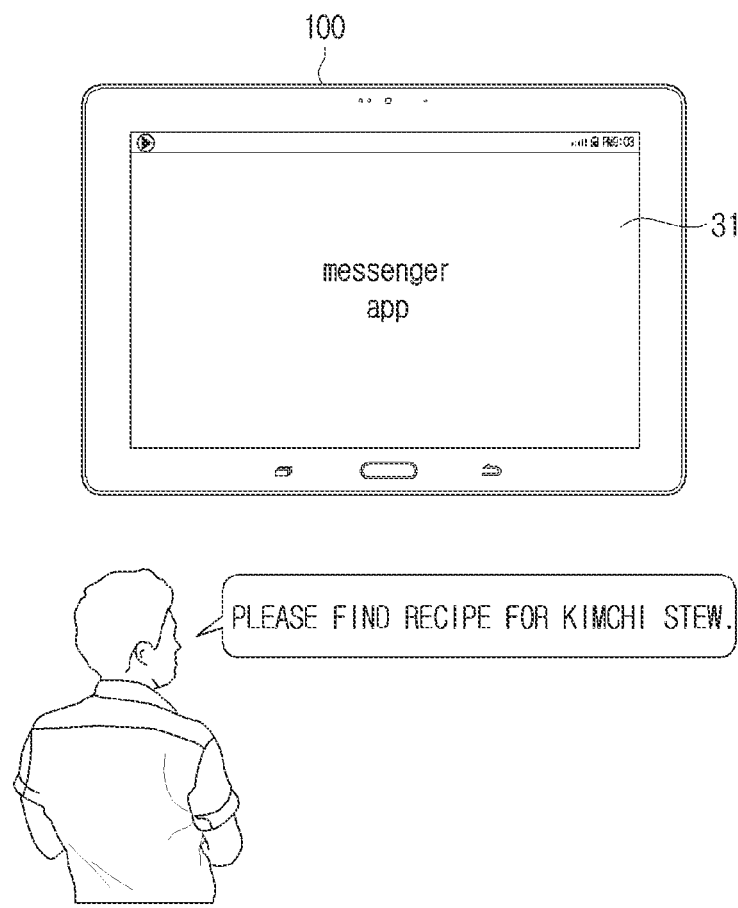
FIG. 3A illustrates an embodiment of displaying only an application for performing a user voice command according to a user voice command, according to an embodiment of the disclosure.
Figure 3B:
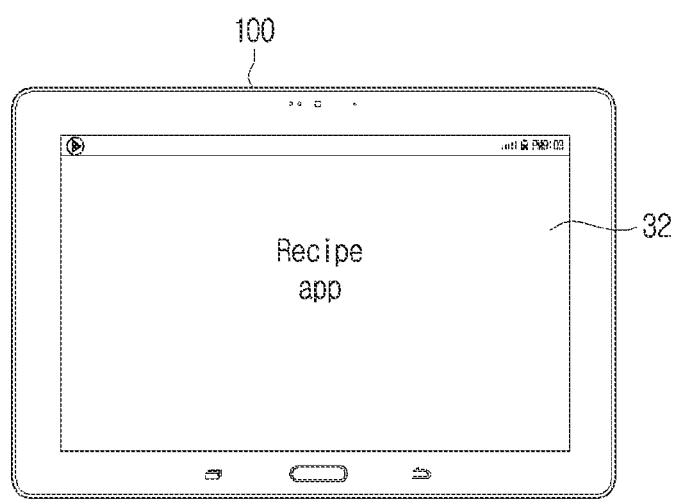
FIG. 3B is a diagram illustrating an example of displaying an application for performing a user voice command according to a user voice command, according to various embodiments.

FIGS. 3A and 3B are diagrams illustrating an example of displaying only an application for performing a user voice command according to a user voice command, according to various embodiments.

Referring to FIG. 3A, when a messenger application is executed in a foreground of the electronic apparatus 100, and a music playback application is executed in the background of the electronic apparatus 100, the electronic apparatus 100 may receive a voice command of a user. While the screen 31 provided by the messenger application is being displayed on the display of the electronic apparatus 100, the electronic apparatus 100 may obtain a user voice command "please find a Kimchi stew recipe" through the microphone.

When a user voice command is obtained, the electronic apparatus 100 may identify the application for performing a user voice command as a recipe application through the application determination model 141-1.

The electronic apparatus 100 may identify whether the recipe application should be executed in the foreground of the electronic apparatus 100 through the ground identification model 141-2. For example, the ground identification model 141-2 may identify that the recipe application should be executed in the foreground according to the user voice command "please find recipe for Kimchi stew."

The electronic apparatus 100 may identify whether to execute the recipe application together with a messenger application in the foreground through the multi-window identification model 141-3. As an example, if there is little usage history of executing a recipe application and a messenger application of existing users as a multi-window, the electronic apparatus 100 may identify to execute only the recipe application in the foreground.

The electronic apparatus 100 may execute the recipe application in the foreground while executing the existing music playback application in the background. The electronic apparatus 100 may control the messenger application so that the existing messenger application is executed in the background. The electronic apparatus 100 may display the screen 32 provided by the recipe application on the display as illustrated in FIG. 3B.

Figure 4A:
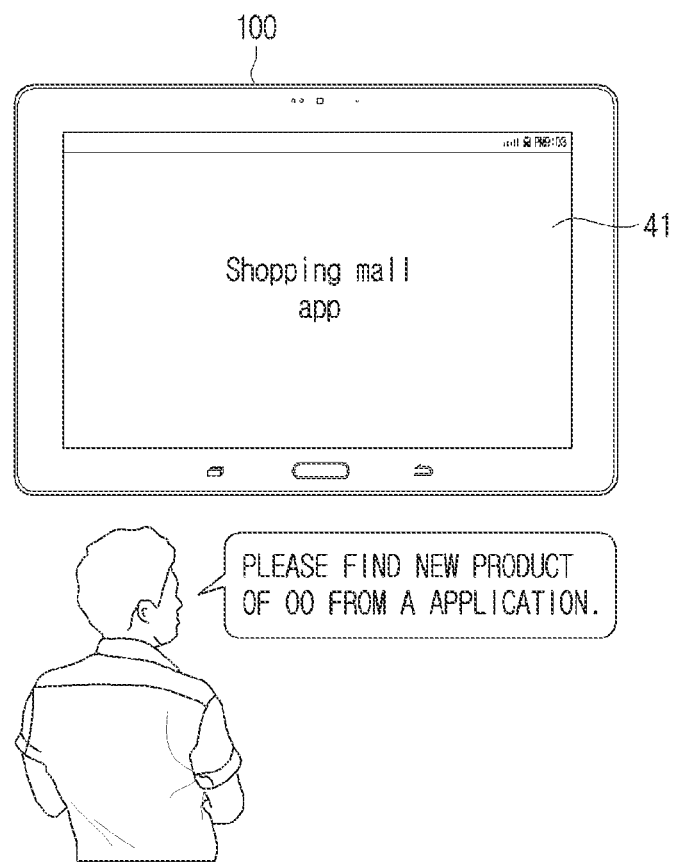
FIG. 4A is a diagram illustrating an example of displaying an application which is executed according to a user voice command and an application to perform a user voice command together as a multi-window according to a user voice command, according to various embodiments.
Figure 4B:
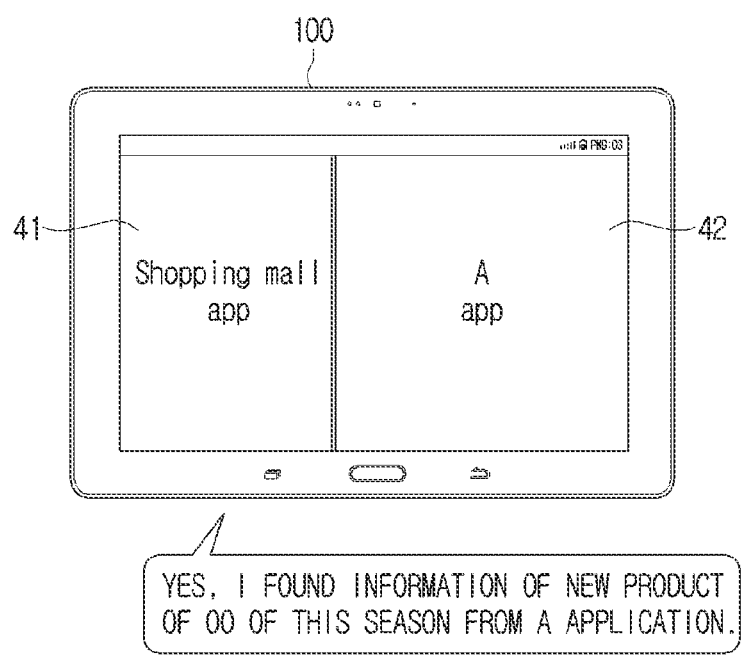
FIG. 4B is a diagram illustrating an example of displaying an application which is executed according to a user voice command and an application to perform a user voice command together as a multi-window according to a user voice command, according to various embodiments.

FIGS. 4A and 4B are diagrams illustrating an example of displaying an application which is executed according to a user voice command and an application to perform a user voice command together as a multi-window according to a user voice command, according to various embodiments.

Referring to FIG. 4A, while a shopping mall application is being running in the foreground of the electronic apparatus 100, the electronic apparatus 100 may receive a voice command of a user. While a screen 41 providing a shopping mall application is being displayed on the display of the electronic apparatus 100, the electronic apparatus 100 may obtain a user voice command, "please find a new product of oo from A application" through the microphone.

When the user voice command is obtained, the electronic apparatus 100 may identify the application to perform the user voice command as the A application through the application determination model 141-1.

The electronic apparatus 100 may identify that the A application needs to be executed in the foreground of the electronic apparatus 100 through the ground identification model 141-2.

The electronic apparatus 100 may identify that the Application should be executed in the foreground along with the shopping mall application as the multi-window identification model 141-3.

The electronic apparatus 100 may identify the layout for each of the shopping mall application and A application through a layout identification model 141-4.

The electronic apparatus 100 may execute the A application and the shopping mall application according to the identified layout. As shown in FIG. 4B, the electronic apparatus 100 may display the screen 42 provided by the A application and the screen 41 provided by the shopping mall application on the display according to the identified layout.

The electronic apparatus 100 may provide information for guiding completion of an operation corresponding to the user voice command. The electronic apparatus 100 may output voice information guiding that OO new product is searched from A application through the user voice command as illustrated in FIG. 4B. The information about guiding completion of an operation will be described in greater detail below with reference to FIG. 8.

Figure 5A:
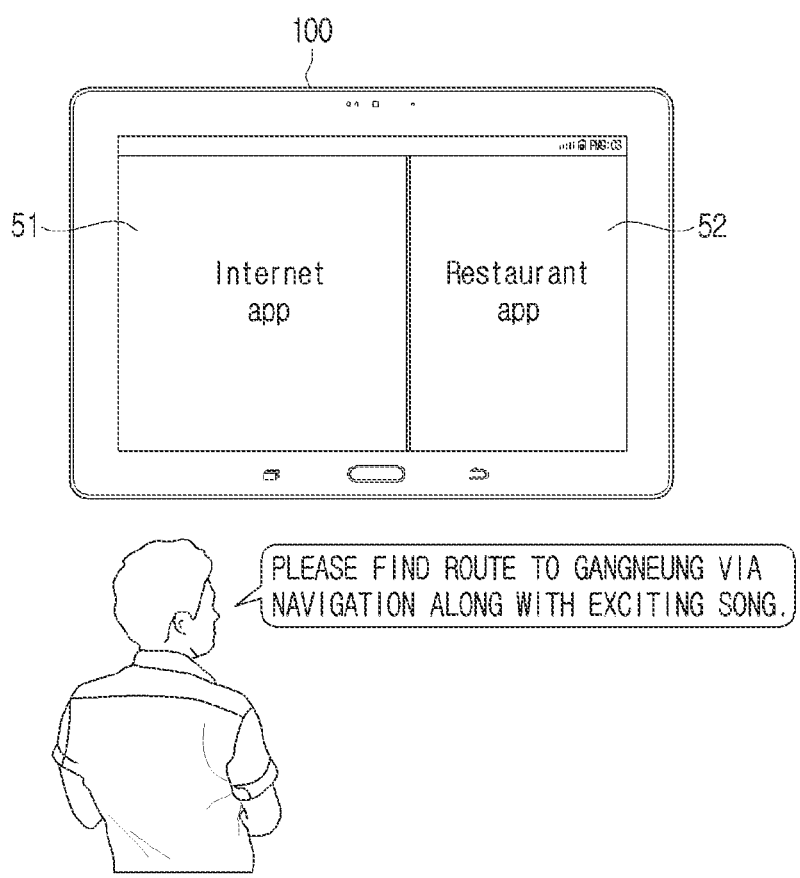
FIG. 5A is a diagram illustrating an example of executing a plurality of applications for performing a user voice command in the foreground and background, according to various embodiments.
Figure 5B:
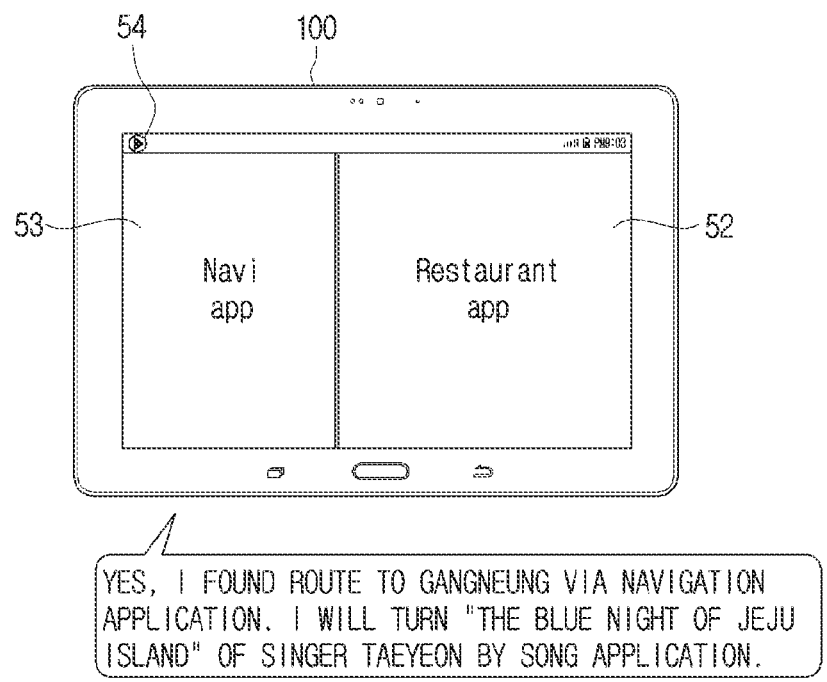
FIG. 5B is a diagram illustrating an example of executing a plurality of applications for performing a user voice command in the foreground and background, according to various embodiments.

FIGS. 5A and 5B are diagrams illustrating an example of executing a plurality of applications for performing a user voice command in the foreground and background, according to various embodiments.

Referring to FIG. 5A, while an Internet application and a restaurant application are being executed together as a multi-window, the electronic apparatus 100 may receive a voice command of a user. While a screen 51 providing the Internet application and a screen 52 provided by the restaurant application are displayed on the display of the electronic apparatus 100, the electronic apparatus 100 may obtain the user voice command "please find a route to Gangneung via navigation along with an exciting song" through the microphone.

When a user voice command is obtained, the electronic apparatus 100 may identify the application for performing a user voice command as the navigation application and the music playback application through the application determination model 141-1.

The electronic apparatus 100 may identify that the navigation application is executed in the foreground of the electronic apparatus 100 through the ground identification model 141-2 and that music playback application is to be executed in the background of the music playback application.

The electronic apparatus 100 may identify the application to be executed in the foreground along with the navigation application as the restaurant application through the multi-window identification model 141-3.

The electronic apparatus 100 may identify the layouts of each of the navigation application and the restaurant application through the layout identification model 141-4.

The electronic apparatus 100 may execute a navigation application and a restaurant application in the foreground according to the identified layout. As shown in FIG. 5B, the electronic apparatus 100 may display the screen 53 provided by the navigation application and the screen 52 provided by the restaurant application together on the display.

The electronic apparatus 100 may execute a music playback application in the background and play an exciting song in a music playback application. For example, as shown in FIG. 5B, the electronic apparatus 100 may further display an icon 54 indicating that the music playback application is running in the background on an upper portion of the display.

The electronic apparatus 100 may provide information for guiding completion of an operation corresponding to a user voice command. For example, as shown in FIG. 5B, the electronic apparatus 100 may output voice information for finding a route to Gangneung via the navigation application in accordance with a user voice command, and output voice information guiding that an exciting song is played in the music playback application.

Figure 6A:
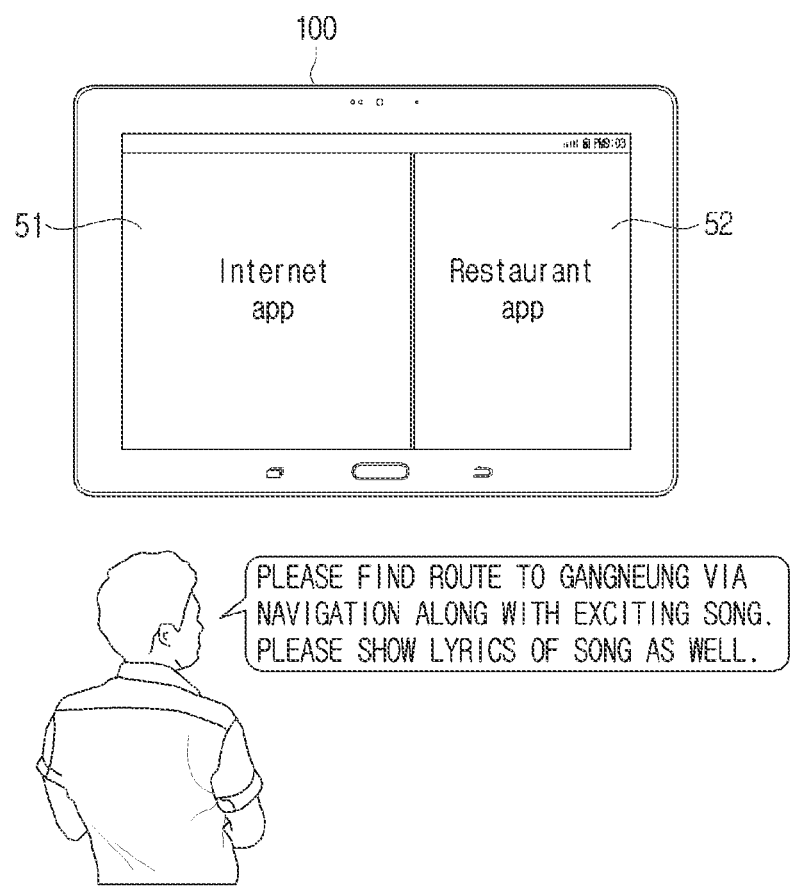
FIG. 6A is a diagram illustrating an example of executing a plurality of applications for performing a user voice command in the foreground and a background, according to various embodiments.
Figure 6B:
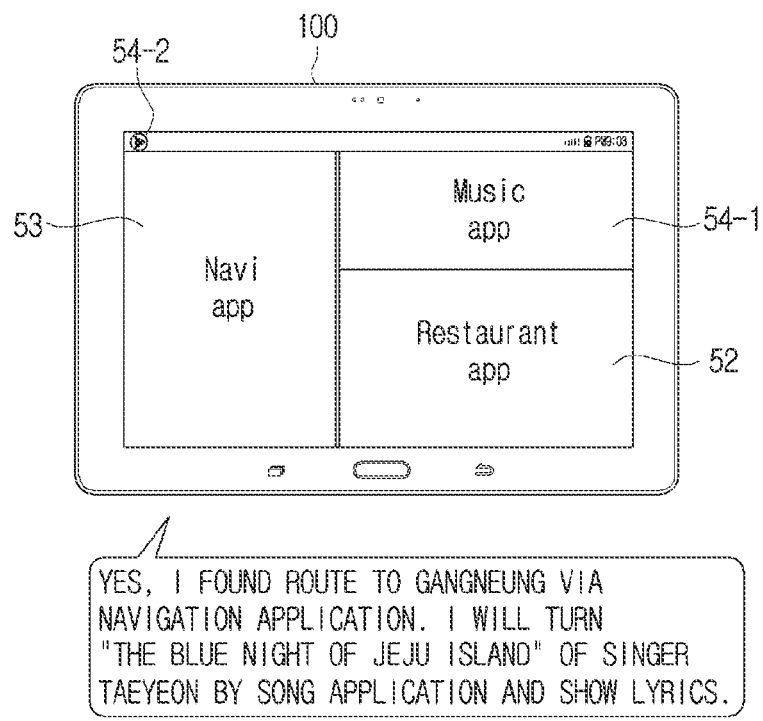
FIG. 6B is a diagram illustrating an example of executing a plurality of applications for performing a user voice command in a foreground and a background, according to various embodiments.

FIGS. 6A and 6B are diagrams illustrating an example of executing a plurality of applications for performing a user voice command in a foreground and a background, according to various embodiments.

Referring to FIG. 6A, while an Internet application and a restaurant application are being executed together as a multi-window in the foreground, the electronic apparatus 100 may receive a voice command of a user. While the screen 51 provided by the Internet application and the screen 52 provided by the restaurant application are displayed on the display of the electronic apparatus 100, the electronic apparatus 100 may obtain a user voice command "please find a route to Gangneung via navigation along with an exciting song. Please show song lyrics as well" through the microphone.

When the user voice command is obtained, the electronic apparatus 100 may identify the application to perform the user voice command as the navigation application and the music playback application through the application determination model 141-1.

The electronic apparatus 100 may identify that the navigation application and the music playback application are executed in the foreground of the electronic apparatus 100 through the ground identification model 141-2.

The electronic apparatus 100, through the multi-window identification model 141-3, may identify that the application to be executed in the foreground along with the navigation application and the music playback application as the restaurant application.

The electronic apparatus 100 may identify layouts of the navigation application, music playback application, and restaurant application, respectively, through the layout identification model 141-4.

The electronic apparatus 100 may execute a navigation application, a music playback application, and a restaurant application according to the identified layout. For example, as shown in FIG. 6B, the electronic apparatus 100 may display the screen 53 provided by the navigation application according to the identified layout, the screen 54-1 provided by the music playback application, and the screen 52 provided by the restaurant application together on the display. For example, as shown in FIG. 6B, the electronic apparatus 100 may further display an icon 54-2 indicating that the music playback application is running on the top of the display.

The electronic apparatus 100 may provide information guiding that the operation corresponding to the user voice command is completed. As illustrated in FIG. 6B, the electronic apparatus 100 may output voice information guiding that a route to Gangneung has been found via a navigation application and an exciting song is played by a music playback application, and lyrics are provided according to a user voice command.

Figure 7A:
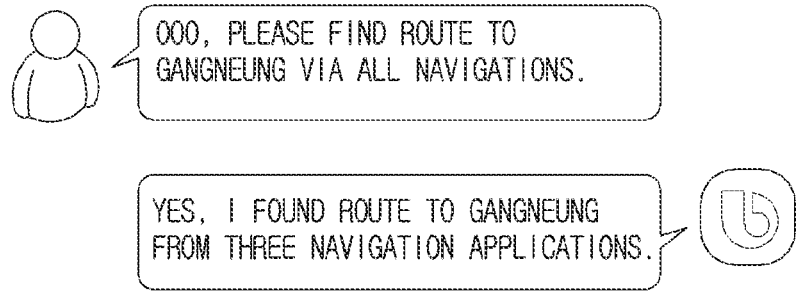
FIG. 7A is a diagram illustrating an example of identifying a plurality of applications to perform a user voice command according to various embodiments.

FIG. 7A is a diagram illustrating an example of identifying a plurality of applications to perform a user voice command according to various embodiments.

According to an embodiment, the electronic apparatus 100 may output voice information corresponding to the voice command of the user.

Referring to FIG. 7A, the electronic apparatus 100 may obtain a user voice command "000, please find a route to Gangneung via all navigations". Here, 000 may be a wake-up sound for executing a speech recognition system according to the disclosure. The electronic apparatus 100 may identify an application for executing a voice command of a user as a plurality of navigation applications installed in the electronic apparatus 100 using the voice recognition system shown in FIG. 1.

The electronic apparatus 100 may control a plurality of navigation applications to execute a command corresponding to a voice command of a user in the identified navigation application.

The electronic apparatus 100 may output voice information notifying that an operation corresponding to the user voice command is performed such as "Yes, I found route to Gangneung from three navigation applications."

Figure 7B:
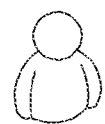
FIG. 7B is a diagram illustrating an example of identifying a plurality of applications corresponding to a user voice command, and outputting voice information to identify an application to execute a user voice command among the plurality of identified applications according to various embodiments.
Figure 7B:
Figure 7B:
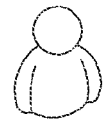
Figure 7B:
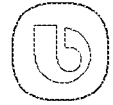

FIG. 7B is a diagram illustrating an example of identifying a plurality of applications corresponding to a user voice command and outputting voice information to identify an application to execute a user voice command among the plurality of identified applications according to various embodiments.

The electronic apparatus 100 according to the disclosure may output voice information for a user voice command to identify an application to execute a user voice command.

Referring to FIG. 7B, the electronic apparatus 100 may obtain a user voice command such as "000, please turn on Sunny". The electronic apparatus 100 may identify a type of an application to perform a user voice command as a music playback application type and a video playback application type. The electronic apparatus 100 may output voice information such as a "I found the content of Sunny from A application and B application. Which one would you watch?" to identify an application to execute a voice command of a user from among a plurality of applications corresponding to the type identified in the electronic apparatus 100 (for example, A application and a B application).

The electronic apparatus 100 may obtain a user voice command corresponding to the outputted voice information. In other words, the electronic apparatus 100 may control the A application such that the content corresponding to the "Sunny" is played by a user voice command such as "upper one".

The electronic apparatus 100 may output voice information indicating that an operation corresponding to a user voice command has been performed in the A application, such as "Yes, I will play contents of Sunny from A application."

Figure 8:
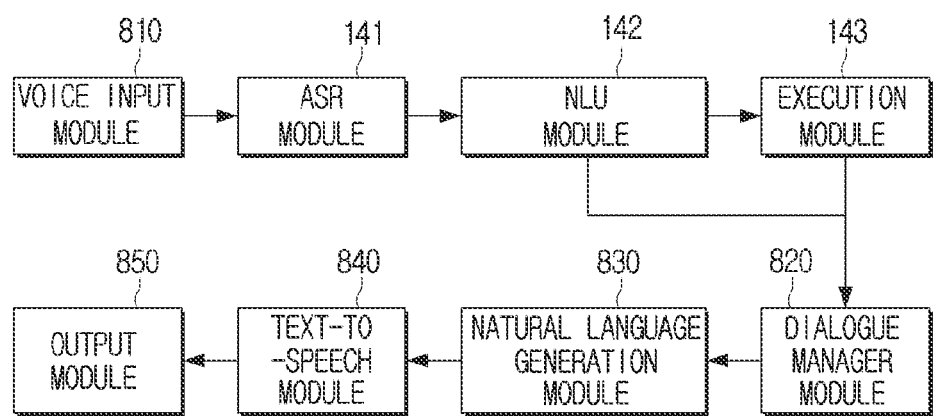
FIG. 8 is a block diagram illustrating an example configuration of a voice recognition system for providing a response to a user voice command according to various embodiments.

The embodiment of outputting voice information corresponding to the voice command of a user as illustrated in FIGS. 7A and 7B may be implemented by a plurality of modules of FIG. 8.

FIG. 8 is a block diagram illustrating an example configuration of a voice recognition system for providing a response to a user voice command according to various embodiments.

Referring to FIG. 8, the electronic apparatus 100 may receive user voice through a voice input module (e.g., including voice input circuitry) 810. The voice input module 810 may be a configuration for receiving user voice in the form of voice data. The voice input module 810 may receive an analog audio signal including user voice through the microphone 130 of the electronic apparatus 100, and convert the analog signal into a digital signal. In an embodiment, the voice input module 810 may remove the noise component from the digital signal to obtain voice data corresponding to the user voice command. However, according to an embodiment, the voice input module 810 may not remove a separate noise component, and then the noise included in the digital signal may be removed through the speech recognition model. The user voice received through the voice input module 810 may be in the form of a sentence or phrase including at least one text, but it is merely an embodiment, and may include a plurality of sentences or phrases.

The microphone included in the voice input module 810 may be provided inside the electronic apparatus 100, but this is merely an example, and may be connected to the electronic apparatus 100 provided outside in a wired or wireless manner. The voice input module 810 may include a communication module for receiving a user voice from an external device.

The ASR module 141 may include various processing circuitry and/or executable program elements and convert the user voice in the voice format received from the speech input module 810 to the text data. The natural language understanding module (NLU) 142 may include various processing circuitry and/or executable program elements and recognize the intent of a user and a domain of user's utterance by performing syntactic analysis or semantic analysis. The execution module 143 may include various processing circuitry and/or executable program elements and identify at least one application to perform a user voice command based on the intent and the slot obtained through the NLU module 142, and the text data corresponding to the user voice command obtained through the ASR module 141, and may control the identified application to perform an operation corresponding to the user's voice command.

The ASR module 141, the NLU module 142, and the execution module 143 have been illustrated in FIG. 1 and a detailed description may not be repeated here.

The dialogue manager module 820 may include various processing circuitry and/or executable program elements and provide a response to the user's uttered speech based on information about the user intent and slot obtained through the natural language understanding module 142 or a control operation of the obtained application. At this time, the dialogue manager module 820 may provide a response to the user's uttered speech based on the knowledge base. Here, the knowledge base can be included in the electronic apparatus 100, but this is only an embodiment, and can be included in an external server.

The dialog manager module 820 may identify whether the intent of the user identified by the NLU module 142 is clear. For example, the dialog manager module 820 may identify whether the user intent is clear based on whether information about the slot is sufficient. The dialog manager module 820 may identify whether the slot identified by the NLU module 142 is sufficient to perform the function to be performed by the user. According to an embodiment, the dialog manager module 820 may perform feedback for requesting information necessary for the user when the user's intent is not clear.

The natural language generation module 830 may include various processing circuitry and/or executable program elements and change the designated information into a text form. The information changed in the text form may be a form of natural language. The designated information may be, for example, information about an additional input, information for guiding completion of a task corresponding to a user input, information about a response to an inquiry, or information for guiding an additional input of a user (for example: feedback information for a user input). The information changed in the text form may be displayed on a display of the electronic apparatus 100 or changed into a speech form by a text-to-speech (TTS) module 840.

The TTS module 840 may include various processing circuitry and/or executable program elements and change the information of the text format to speech format information. The TTS module 840 may receive information of a text format from the natural language generation module 830, change the information of the text format into information of a speech data format.

The output module 850 may include various output circuitry and output information in the form of speech data received from the TTS module 840. The output module 850 may output information in the form of speech data through a speaker or a speech output terminal. The output module 850 may output information in the form of text data obtained through the natural language generation module 830 through a display or an image output terminal.

Figure 9:
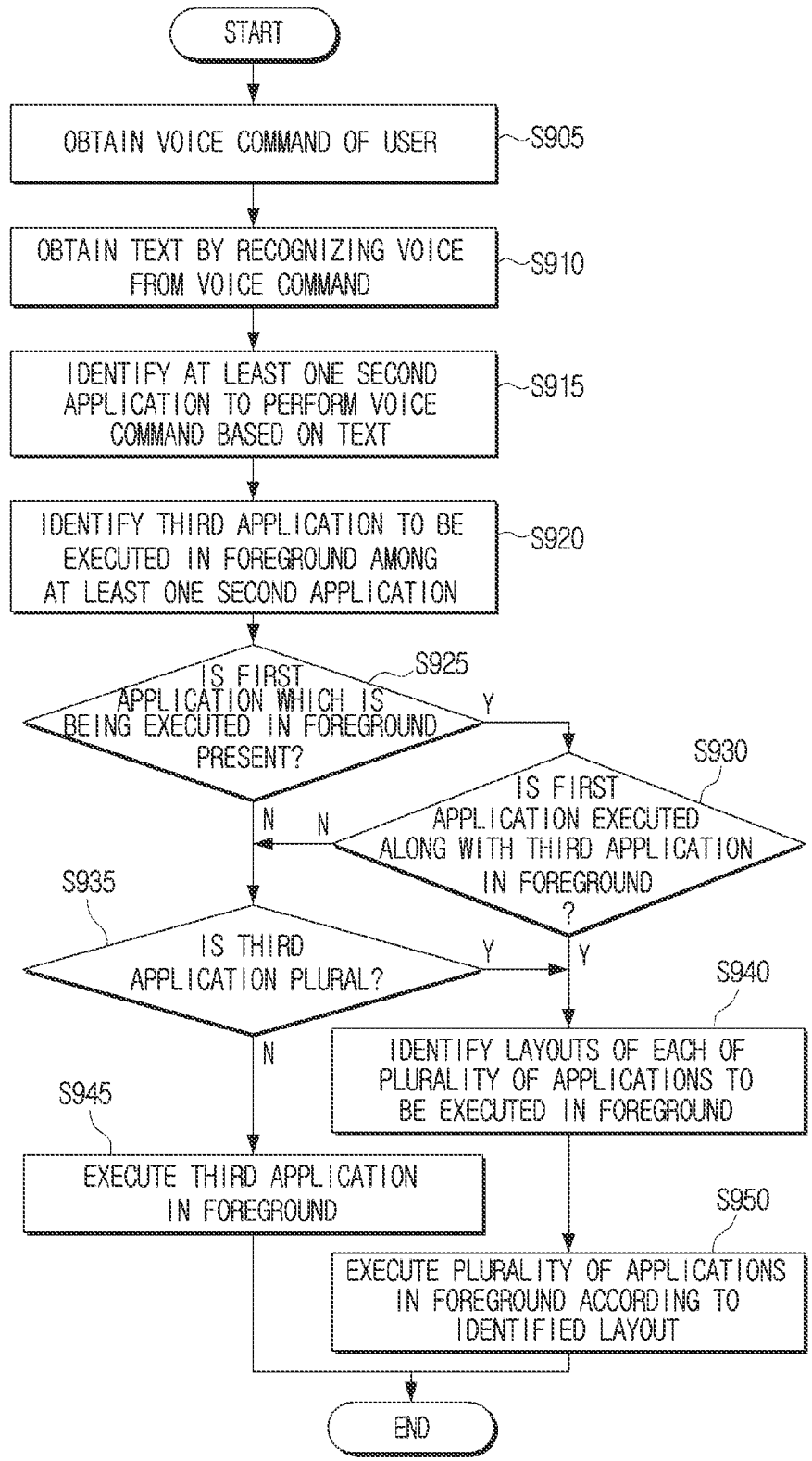
FIG. 9 is a flowchart illustrating an example method of controlling an electronic device for providing an application executing in the foreground and an application corresponding to a user voice command according to various embodiments.

FIG. 9 is a flowchart illustrating an example method of controlling an electronic device for providing an application executing in the foreground and an application corresponding to a user voice command according to various embodiments.

Referring to FIG. 9, the electronic apparatus 100 may obtain a user's voice command in operation S905. The electronic apparatus 100 may obtain text by voice recognition of the obtained voice command in operation S910.

The electronic apparatus 100 may identify at least one second application to perform a voice command based on the obtained text in operation S915. For example, when a user's voice command is a voice command for controlling a plurality of applications, the electronic apparatus 100 may identify a plurality of applications corresponding to a user command as a second application.

The electronic apparatus 100 may identify a third application to be executed in the foreground among at least one second application in operation S920. The electronic apparatus 100 may identify a third application to provide a screen through the electronic apparatus 100 of the at least one second application.

If there is a first application running on the current foreground in operation S925-Y, the electronic apparatus 100 may identify whether the first application should be executed in the foreground with the third application in operation S930.

If the first application is identified as being executed in the foreground with the third application in operation S930-Y, the electronic apparatus 100 may identify the layout of each of the plurality of applications to be executed in the foreground in operation S940. The electronic apparatus 100 may identify a layout of each of the first application and the third application. The electronic apparatus 100 may execute a plurality of applications in a foreground according to the identified layout in operation S950.

If the first application is not identified as being executed in the foreground with the third application in operation S930-N, the electronic apparatus 100 may identify whether the third application is plural in operation S935. As a result of the identification, if the third application is a plurality of applications in operation S935-Y, the electronic apparatus 100 may identify the layout of each of the plurality of applications to be executed in the foreground in operation S940. The electronic apparatus 100 may identify the layout of each of the plurality of third applications. The electronic apparatus 100 may execute a plurality of applications in a foreground according to the identified layout in operation S950. As a result of the identification, if the third application is not a plurality of applications in operation S935-N, the electronic apparatus 100 may execute one third application in the foreground in operation S945.

If there is no first application currently running in the foreground in operation S925-N, the electronic apparatus 100 may identify whether the third application is multiple in operation S935. As a result of the identification, if the third application is a plurality of applications in operation S935-Y, the electronic apparatus 100 may identify the layout of each of the plurality of applications to be executed in the foreground in operation S940. The electronic apparatus 100 may identify the layout of each of the plurality of third applications. The electronic apparatus 100 may execute a plurality of applications in the foreground according to the identified layout in operation S950. As a result of the identification, if the third application is not a plurality of applications in operation S935-N, the electronic apparatus 100 may execute one third application in the foreground in operation S945.

Figure 10:
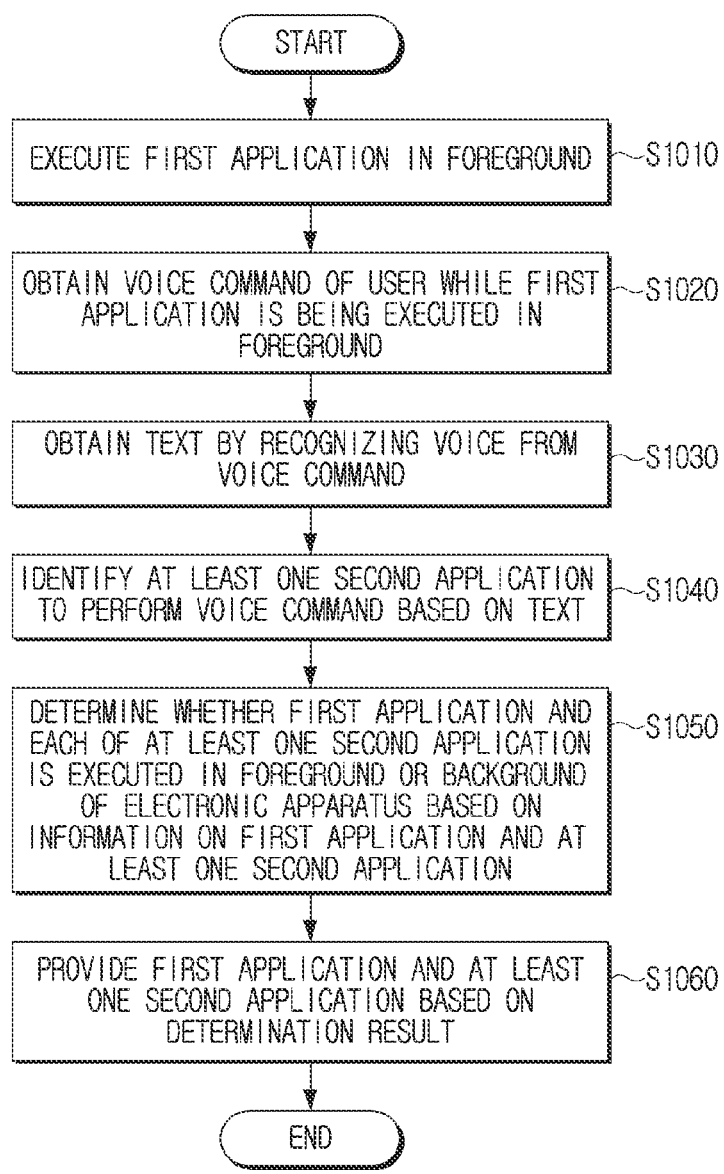
FIG. 10 is a flowchart illustrating an example method of controlling an electronic device according to various embodiments.

FIG. 10 is a flowchart illustrating an example method of controlling an electronic device according to various embodiments.

Referring to FIG. 10, the electronic apparatus 100 may execute the first application in the foreground in operation S1010. The electronic apparatus 100 may display a screen provided by the first application on the display.

While executing the first application in the foreground, the electronic apparatus 100 may obtain a user's voice command in operation S1020.

When a voice command of the user is obtained, the electronic apparatus 100 may obtain a text by voice recognition of a voice command in operation S1030. Here, the text may be text data obtained through the ASR module 141 according to the disclosure.

The electronic apparatus 100 may identify at least one second application to perform a voice command based on the text in operation S1040. The electronic apparatus 100 may identify at least one second application corresponding to the voice command of the user based on the text according to the voice recognition system.

The electronic apparatus 100 may determine whether the first application and each of the at least one second application is executed in the foreground or background of the electronic apparatus 100 based on the information on the first application and the at least one second application in operation S1050.

Based on the determination result, the electronic apparatus 100 may provide the first application and the at least one second application in operation S1060. When a plurality of applications to be executed in the foreground of the electronic apparatus are multiple, the electronic apparatus 100 may identify a layout of each of the plurality of applications, and execute each of the plurality of applications in the foreground of the electronic apparatus 100 according to the identified layout.

The electronic apparatus 100 may identify a third application to be executed in the foreground of the electronic apparatus 100 among the at least one second application based on the text, and identify whether to execute the first application together with the third application based on the information on the third application. As an example, the electronic apparatus 100 may identify whether to execute a first application with a third application through an artificial intelligence model trained based on a usage history in which the first application and the third application are executed together in the foreground.

When the first application is identified to be executed in the foreground with the third application, the electronic apparatus 100 may identify the layout of each of the first application and the third application. The electronic apparatus 100 may execute each of the first application and the third application in the foreground of the electronic apparatus 100 according to the identified layout.

If the first application is not identified to be executed in the foreground with the third application, the electronic apparatus 100 may execute the third application in the foreground of the electronic apparatus. The electronic apparatus 100 may control so that the first application is executed in the background of the electronic apparatus 100. However, if the third application is plural, layout of each of the plurality of third applications may be identified, and each of the plurality of third applications may be executed in the foreground of the electronic apparatus 100 according to the identified layout.

The electronic apparatus 100 may identify a fourth application to be executed in the background of the electronic apparatus 100 of the at least one second application based on the text. The electronic apparatus 100 may control the operation corresponding to the voice command to be performed in the fourth application while operating the fourth application in the background.

Figure 11:
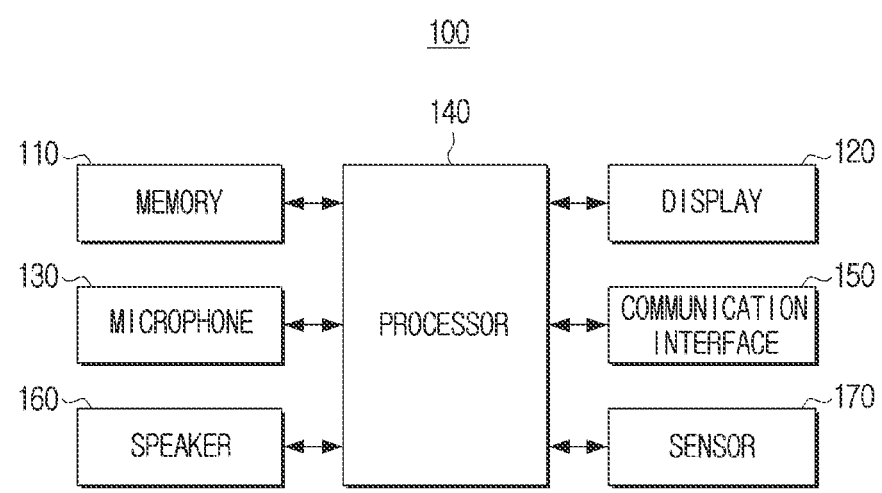
FIG. 11 is a block diagram illustrating an example configuration of an electronic device, according to various embodiments.

FIG. 11 is a block diagram illustrating an example configuration of an electronic apparatus, according to various embodiments. As shown in FIG. 11, the electronic apparatus 100 may include a memory 110, a display 120, a microphone 130, a processor (e.g., including processing circuitry) 140, a communication interface (e.g., including communication circuitry) 150, a speaker 160, and a sensor 170. The configuration of the electronic apparatus 100 shown in FIG. 11 may be added or omitted depending on the type of the electronic apparatus 100.

The memory 110, the display 120, and the microphone 130 have been described through FIG. 1, and a detailed description may not be repeated here.

The processor 140 according to the disclosure may include various processing circuitry and obtain a user's voice command while the first application is being executed in the foreground. While the first application is displayed on the display 120, the processor 140 may control the microphone 130 to receive the user voice command.

The processor 140 may obtain text by voice recognition of the voice command. The processor 140 may convert the user's voice command into text through the ASR module 141 of the speech recognition system.

The processor 140 may identify at least one second application to perform a voice command based on the text. Specifically, the processor 140 may input text corresponding to the user's voice command to the NLU module 142 to obtain the intent and slot of the voice command. The processor 140 may identify at least one second application to perform a voice command using at least one of text, intent, and slot corresponding to the user's voice command.

In an embodiment, the processor 140 may identify at least one second application to perform a voice command via the application determination model 141-1 of FIG. 1.

The processor 140 may determine whether each of the first application and the at least one second application is to be executed in the foreground or background of the electronic apparatus 100 based on information on the first application and the at least one second application. Here, the information on the application may include an application type (e.g., music playback application, navigation application), information on the name of an application, and the like. In an embodiment, the processor 140 may determine whether each of the at least one second application is to be executed in the foreground or background of the electronic apparatus 100 via the ground identification model 141-2 of FIG. 1.

Based on an application to be executed in the foreground being plural as a result of the determination, the processor 140 may identify layouts of each of the plurality of applications. In an embodiment, the processor 140 may identify a layout for each of the plurality of applications executing in the foreground via the layout identification model 141-4. The processor 140 may identify layouts of each of the plurality of applications to be executed in the foreground through the layout identification model 141-1 based on the layout usage history of the plurality of applications to be executed in the foreground.

The processor 140 may identify a third application to be executed in a foreground of the electronic apparatus 100 among at least one second application to perform a voice command based on at least one of a text, an intent, and a slot corresponding to the voice command, and identify a fourth application to be executed in the background of the electronic apparatus 100. The processor 140 may control the fourth application so that an operation corresponding to the voice command is executed in the fourth application while operating the fourth application in the background and may control the third application so that the third application is executed in the foreground.

The processor 140 may identify whether to execute the first application together with the third application according to the user voice command based on the information on the third application.

In an embodiment, the processor 140 may identify whether to execute the first application together with the third application in accordance with the user voice command via the multi-window identification model 141-3 of FIG. 1. The processor 140 may identify whether to execute the first application along with the third application through the multi-window identification model 141-3 trained based on usage history that the first application is executed along with the third application in the foreground.

If the first application is identified to be executed in the foreground with the third application according to the user voice command, the processor 140 may identify a layout for displaying the first application and the third application on the display 120, respectively. In an embodiment, the processor 140 may identify a layout for each of the first application and the third application via the layout identification model 141-4. For example, the processor 140 may identify a layout for each of the first application and the third application through a layout identification model 141-4 trained based on the layout usage history of the first application and the third application. The processor 140 may execute each of the first application and the third application in the foreground of the electronic apparatus according to the identified layout. That is, the processor 140 may control the display 120 to display each of the first and third applications on the display 120 according to the identified layout.

If the first application is not identified as being executed in the foreground with the third application according to the user voice command, the processor 140 may execute the third application in the foreground of the electronic apparatus 100. The processor 140 may control the display 120 to display the third application screen on the screen of the display 120, and control the first application to be executed in the background.

According to an embodiment, based on the third application to be executed in the foreground of the electronic device according to a user voice command being plural, the processor 140 may identify layouts of each of the plurality of third applications. As an example, the processor 140 may identify the layout of each of the plurality of third applications via the layout identification model 141-4. In addition, the processor 140 may execute each of the plurality of third applications in a foreground according to the identified layout. The processor 140 may control the display 120 to display each of the screens provided by the plurality of third applications on the display 120 according to the identified layout.

The communication interface 150 may include various communication circuitry and is configured to communicate with various types of external devices in accordance with various types of communication schemes. The communication interface 150 may include a Wi-Fi module, a Bluetooth module, an infrared communication module, a wireless communication module, or the like. The processor 140 may communicate with various external devices using the communication interface 150. The communication interface 150 may communicate with an external server for voice recognition, machine translation, and natural language understanding. The communication interface 150 may transmit a user voice in a voice data type to an external server for voice recognition.

The speaker 160 may include a component that outputs various kinds of notification sound or voice messages as well as various audio data received from the outside. The electronic apparatus 100 may include an audio output device such as the speaker 160, but may include an output device such as an audio output terminal. The speaker 160 may provide a response result and an operation result of the user voice in a voice form.

The sensor 170 may obtain various information related to the electronic apparatus 100. The sensor 170 may include a global positioning system (GPS) capable of obtaining location information of the electronic apparatus 100, and may include various sensors such as a biometric sensor (e.g., a heart rate sensor, a photoplethysmography (PPG) sensor, etc.) for obtaining biometric information of a user using the electronic apparatus 100, and a motion sensor for sensing the movement of the electronic apparatus 100.

An input interface (not shown) may be implemented using a device such as a button, a touch pad, a mouse, a keyboard, or a touch screen capable of performing the above-described display function and manipulation input function. Here, the button may be various types of buttons such as a mechanical button, a touch pad, a wheel, or the like, formed in an arbitrary region such as a front portion, a side portion, a back portion, or the like, of the outer surface of the main body of the electronic apparatus 100.

It is to be understood that various example embodiments include various modifications, equivalents, and/or alternatives. In connection with the description of the drawings, similar reference numerals may be used for similar components.

In this disclosure, the expressions "have," "may have," "include," or "may include" or the like represent presence of a corresponding feature (for example: components such as numbers, functions, operations, or parts) and does not exclude the presence of additional feature.

In this disclosure, expressions such as "A or B", "at least one of A [and/or] B,", or "one or more of A [and/or] B," include all possible combinations of the listed items. For example, "at least one of A and B," or "at least one of A or B" includes any of (1) at least one A, (2) at least one B, or (3) at least one A and at least one B. As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to a device being "specifically designed to" in terms of hardware. Instead, under some circumstances, the expression "a device configured to" may refer to the device "being capable of" performing an operation together with another device or component." For example, the phrase "a processor configured to perform A, B, and C" may refer to a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

The term "unit" or "module" used in the disclosure includes units including hardware, software, or firmware, and may be used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions, and may include a stack-type display device. When the instructions are executed by a processor, the processor may directory perform functions corresponding to the instructions using other components or the functions may be performed under a control of the processor. The instructions may include code generated by a compiler or a code executed by an interpreter. The machine-readable storage media may be provided in a form of a non-transitory storage media. The 'non-transitory' storage media does not include a signal and is tangible, but does not distinguish whether data is stored semi-permanently or temporarily in the storage media.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for controlling an electronic apparatus, the method comprising:
obtaining a text by recognizing a voice command;
identifying at least one second application to perform the voice command based on the text;
identifying a third application to be executed in a foreground of the electronic device among the at least one second application based on the text;
based on an existence of a first application currently being executed in the foreground, identifying whether to execute the first application together with the third application in the foreground based on usage history of a multi window of the first application and the third application;
based on identification that the first application is to be executed together with the third application in the foreground, identifying layouts of each of the first application and the third application, and executing each of the first application and the third application in the foreground of the electronic apparatus based on the identified layouts; and
based on identification that the first application is not executed in the foreground together with the third application, identifying a layout of the third application and executing the third applications in the foreground of the electronic apparatus based on the identified layout and executing the first application in the background of the electronic apparatus.

2. The method of claim 1, wherein the identifying the layouts comprises identifying layouts of each of the plurality of applications through an artificial intelligence model trained based on layout usage history of the plurality of applications.

3. The method of claim 1, wherein the identifying whether to execute the first application together with the third application comprises: identifying whether to execute the first application together with the third application through the artificial intelligence model trained based on the usage history of the multi window that the first application is executed along with the third application in the foreground.

4. The method of claim 1, further comprising:
identifying a fourth application to be executed in the background of the electronic apparatus among the at least one second applications based on the text, and
controlling that the electronic apparatus to perform an operation corresponding to the voice command is executed in the fourth application while operating the fourth application in the background.

5. An electronic apparatus comprising:
a memory storing at least one instruction; and
a processor configured to control the electronic apparatus by executing at least one instruction stored in the memory, and configured to:
obtain a text by recognizing the voice command,
identify at least one second application to perform the voice command based on the text,
identify a third application to be executed in a foreground of the electronic device among the at least one second application based on the text;
based on an existence of a first application currently being executed in the foreground, identify whether to execute the first application together with the third application in the foreground based on usage history of a multi window of the first application and the third application;
based on identification that the first application is to be executed together with the third application in the foreground, identify layouts of each of the first application and the third application; and execute each of the first application and the third application in the foreground of the electronic apparatus based on the identified layouts;
based on identification that the first application is not to be executed in the foreground together with the third application, identify a layout of the third application; and execute the third application in the foreground of the electronic apparatus based on the identified layout and execute the first application in the background of the electronic apparatus.

6. The electronic apparatus of claim 5, wherein the processor is further configured to identify the layouts comprises: identifying layouts of each of the plurality of applications through an artificial intelligence model trained based on layout usage history of the plurality of applications.

7. The electronic apparatus of claim 5, wherein the processor is further configured to identify whether to execute the first application together with the third application through the artificial intelligence model trained based on the usage history of the multi window that the first application is executed together with the third application in the foreground.

\* \* \* \* \*